Figure 1:
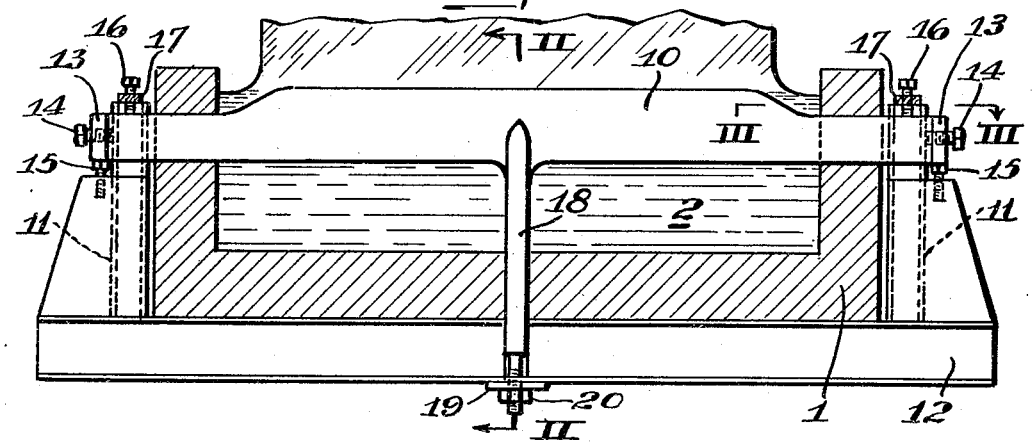

July 21, 1931.  R. L. CLAUSE  1,815,288

APPARATUS FOR DRAWING SHEET GLASS

Filed July 25, 1929   2 Sheets-Sheet 1

INVENTOR
Robert L. Clause
by James L. Bradley
atty

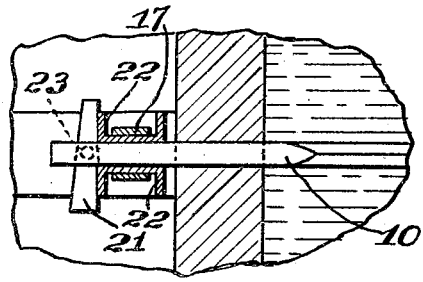
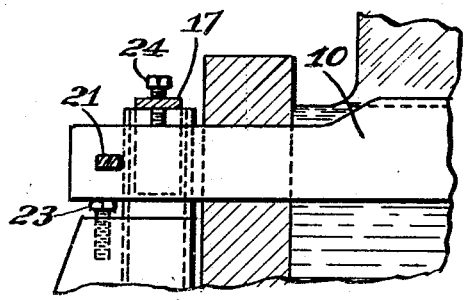
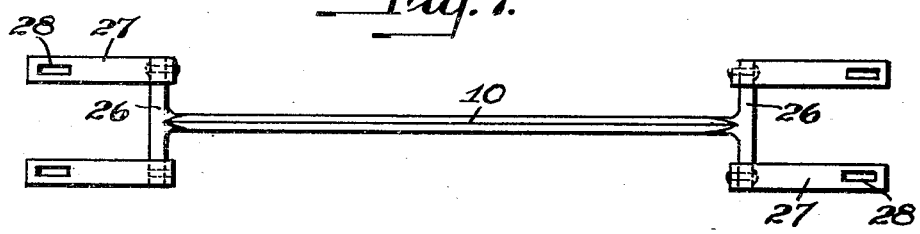
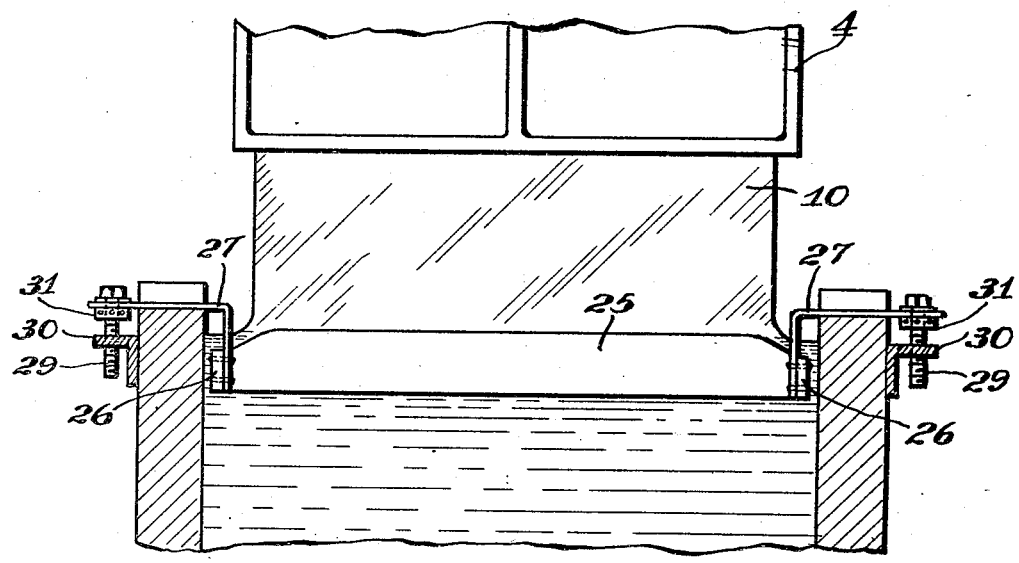

Patented July 21, 1931

1,815,288

UNITED STATES PATENT OFFICE

ROBERT L. CLAUSE, OF SEWICKLEY, PENNSYLVANIA, ASSIGNOR TO PITTSBURGH PLATE GLASS COMPANY, A CORPORATION OF PENNSYLVANIA

APPARATUS FOR DRAWING SHEET GLASS

Application filed July 25, 1929. Serial No. 380,920.

Figure 2:
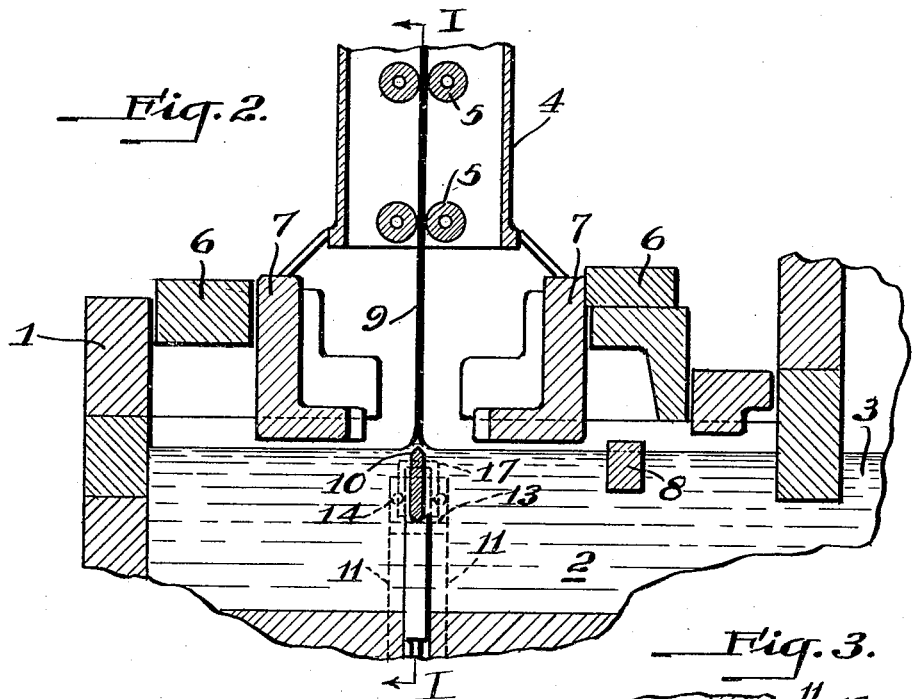
Figure 3:
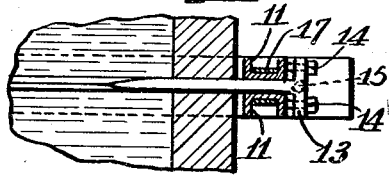
Figure 8:
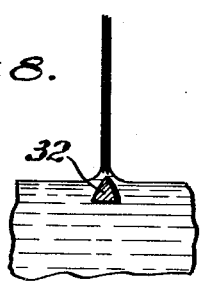

The invention relates to apparatus for making sheet glass and particularly to apparatus for drawing glass from an open bath. It has for its object the provision of improved means for holding the sheet straight at its meniscus or base and preventing its movement longitudinally of the bath during the drawing operation. In practice this result has heretofore been accomplished by the use of what is known as a "draw-bar", such draw-bar being of clay and lying with its upper surface two or three inches below the level of the surface of the glass bath. This is effective but involves some drawbacks. A certain amount of glass is held stagnant on the upper surface of the bar, and gradually devitrifies, such devitrified glass showing up in the sheet after a few days run and requiring a discontinuance of the operation, while heating expedients are employed to thoroughly reheat the portion of the bath above the bar from which the sheet is generated. The bar also contaminates the glass somewhat, and in the course of time is worn or eaten away by the action of the glass, as is the case with all clay surfaces exposed to the action of melted glass. The present invention is designed to provide a guide bar which is not subject to the above drawbacks. This drawbar or guide bar is made of heat resisting metal, instead of clay, and is placed with its upper edge at approximately the level of the glass, so that the sheet is kept from wandering and is held straight due to the engagement of the base of the sheet with the edge of the drawbar, thus differing in action from the clay bar in which the base of the sheet is maintained above the bar due first to the fact that the glass directly above the bar is cooler than the bath on either side thereof, and second to the fact that when an article is drawn from a bath that is cooler at one point than another, the base of the article will always move or tend to move to the cool spot or area. The metal guide bar is a good conductor and has little shielding effect upon the glass along its upper edge so that such glass is maintained at substantially the same temperature as that of the other parts of the bath and there is no tendency of the glass to devitrify, as is the case with the glass on the upper face of a clay draw-bar. The drawing operation may thus be continued for indefinite periods when the metal bar is used without stopping to remelt. There is also no contamination of the glass from the metal bar, and it may be used for long periods without replacement. Captain embodiments of the invention are illustrated in the accompanying drawings, wherein:

Figure 1 is a vertical section on the line I—I of Fig. 2. Fig. 2 is a section on the line II—II of Fig. 1. Fig. 3 is a section on the line III—III of Fig. 1. Figs. 4 and 5 are detail sectional views showing a modification, Fig. 4 being a view taken in horizontal section and Fig. 5 a view taken in vertical section. Fig. 6 is a vertical section through a modification. Fig. 7 is a plan view of the draw-bar of the Fig. 6 construction, and Fig. 8 is a section through a modification.

Referring to Figs. 1 to 5, the reference numeral 1 indicates a drawing tank carrying a body of molten glass 2 and communicating with a melting tank, the extreme end of which, 3, is shown in Fig. 2. Located above the bath 2 is suitable drawing apparatus located in the casing 4. This casing carries a plurality of sets of drawing rolls 5, 5 driven by suitable power means and serving to draw the sheet upward continuously, such sheet being annealed in the casing and severed as it emerges from the top of the casing. Located above the path 2 is a cover consisting of the blocks 6, 6 and the members 7, 7, L-shape in cross section. A skim bar 8 is located in the drawing tank in the line of flow of the glass from the melting tank 3 to the point where the glass sheet 9 is drawn.

Located in the bath 2 beneath the line of generation of the sheet is the guide bar 10 to which the invention is particularly directed. This guide bar is in the form of a plate, preferably of the cross section indicated in Fig. 2 having its upper edge pointed and projecting slightly above the level of the surface of the bath. The plate or bar has its ends extended through the walls of the drawing tank where they are supported upon the stands 11, 11, such stands being in turn secured rigidly to the cross frame 12. The ends of the bar 10 are flanged, as indicated at 13 in Fig. 3, which flanges lie behind the flanges of the two channels making up the stand 11. A pair of bolts 14 extend through the flanges 13 and bear against the flanges of the channels. This provides a means for placing the bar 10 under tension so that it will not warp or bulge upward during the drawing operation incident to the upward pull of the glass sheet upon the bar or plate. In order to fix the vertical position of the bar 10, the stud bolts 15 and 16 are employed. The bolts 15 are threaded into the stands 11 with their heads beneath the flanges 13. The bolts 16 are threaded through strips 17 extending across the upper ends of the stands, such bolts bearing against the upper edge of the bar 10. By this means the vertical position of the bar may be adjusted with exactness and the bar held securely in adjusted position. To still further guard against the bulging of the bar upward during the drawing operation, the center tie or support 18 may be employed, such tie being welded or otherwise secured to the bar 10 and having its lower end extended through the bottom of the drawing tank and through a bracket 19 carried by the frame members 12. The lower end of the bar 18 is threaded and provided with a nut 20. The bar 10 may be made of any suitable refractory alloy which will stand up under the heat conditions encountered and will not discolor the glass. The alloy should be capable of standing 2100 deg. without discoloring the glass, and the temperature of the glass in the drawing tank is somewhat below this point. Such an alloy may be made from iron and chromium or nickel, iron and chromium. No edge holder is shown for maintaining the sheet against contraction during the drawing operation, but it will be understood that the use of such devices is contemplated, such as those shown in the Slingluff Patent No. 1,549,513.

In the modification shown in Figs. 4 and 5, tension is applied to the ends of the bar 10 by means of the wedges 21 which extend through slots in the ends of the bar, such wedges bearing against the faces of the channel members 22, 22 which comprise the upper ends of the stands. The vertical position of the ends of the bars are adjusted by means of stud bolts 23 and 24 which are arranged in the same manner as the bolts 15 and 16 of the Fig. 1 construction. Fig. 6 illustrates another modification of the draw bar construction. In this construction the draw bar 25 is flanged at its ends as indicated at 26 (Fig. 7) and is supported by two pairs of brackets 27 riveted to the ends of the draw bar. These brackets are slotted, as indicated at 28, which slots carry the bolts 29. The bolts 29 are threaded through brackets 30 carried by the side walls of the tank. Such bolts also carry the nuts 31 which may be screwed up and down upon the bolts and so regulate the vertical position of the brackets and draw bar. The position of the bolts themselves may be adjusted in the brackets 30 to suit requirements.

Fig. 8 illustrates another modification in which the metal draw bar 32 is modified in cross section, being of less depth than the draw bar 10 and of greater width. The draw bar may be variously constructed as to cross section, although the plate form shown in Figs. 1 to 5 is preferred. In all forms the upper edge of the draw bar is preferably drawn to a peak and lies at or a trifle above the surface of the glass, so that during the drawing operation, the line of generation of the sheet follows the direction of the draw bar and resistance is offered by the draw bar against movement of the face of the sheet laterally. The draw bar thus serves to hold the sheet straight and keep it from moving longitudinally of the bath during the drawing operation.

The temperature of the body of glass where the sheet emerges therefrom must be considerably below the temperature of the main body of the bath in order to secure a sheet of the proper thickness, and it will be understood that the usual surface chilling devices, well-known in the art but not shown, are employed on each side of the sheet adjacent to the bath.

What I claim is:

1. In combination in apparatus for forming sheet glass from a bath of molten glass, a metal guide plate of heat resisting metal submerged in the bath in a vertical plane with its upper edge located at approximately the level of the surface of the bath, means for drawing a sheet continuously from the bath in line with said plate, and means for holding the plate against warping.

2. In combination in apparatus for forming sheet glass from a bath of molten glass, a metal guide plate of heat resisting metal submerged in the bath in a vertical plane with its upper edge located at approximately the level of the surface of the bath, and means for applying tension to the plate to prevent its warping.

3. In combination in apparatus for forming sheet glass from a bath of molten glass, a metal guide member of heat resisting metal extending horizontally in the bath with its upper edge adjacent the level of the surface of the bath, an anchoring tie extending downward from the member intermediate its ends for preventing the member from bowing up, and means for drawing a sheet continuously from the bath in line with said member.

In testimony whereof, I have hereunto subscribed my name this 19th day of July, 1929.

R. L. CLAUSE.